US010158220B2

(12) United States Patent
Shin et al.

(10) Patent No.: US 10,158,220 B2
(45) Date of Patent: Dec. 18, 2018

(54) TRIPLE REDUNDANT DIGITAL PROTECTIVE RELAY AND OPERATING METHOD THEREFOR

(71) Applicant: YPP CO., LTD., Seoul (KR)

(72) Inventors: Jong Han Shin, Seoul (KR); Yong Gil Kim, Seoul (KR); Jae Hyun Kim, Suwon-si (KR)

(73) Assignee: YPP CO., LTD., Seoul (KR)

( * ) Notice: Subject to any disclaimer, the term of this patent is extended or adjusted under 35 U.S.C. 154(b) by 0 days.

(21) Appl. No.: 15/535,364

(22) PCT Filed: Dec. 11, 2015

(86) PCT No.: PCT/KR2015/013589
§ 371 (c)(1),
(2) Date: Jun. 12, 2017

(87) PCT Pub. No.: WO2016/099083
PCT Pub. Date: Jun. 23, 2016

(65) Prior Publication Data
US 2017/0365992 A1 Dec. 21, 2017

(30) Foreign Application Priority Data
Dec. 15, 2014 (KR) .................. 10-2014-0180115

(51) Int. Cl.
*H02B 1/20* (2006.01)
*H02H 3/05* (2006.01)
*H02H 3/42* (2006.01)

(52) U.S. Cl.
CPC ............... *H02H 3/05* (2013.01); *H02B 1/20* (2013.01); *H02H 3/427* (2013.01)

(58) Field of Classification Search
None
See application file for complete search history.

(56) References Cited

U.S. PATENT DOCUMENTS 4,926,281 A * 5/1990 Murphy ............... G05B 19/054
324/415
6,496,342 B1 * 12/2002 Horvath ................ H02H 7/261
361/62

(Continued)

FOREIGN PATENT DOCUMENTS

CN 101673936 A 3/2010
CN 201916175 U 8/2011

(Continued)

OTHER PUBLICATIONS

Korean Patent Abstract (in English) of KR Patent No. 10-2010-0001926 A, Pub. Date Jan. 6, 2010, downloaded on Jun. 6, 2017 from http://worldwide.espacenet.com/.

(Continued)

*Primary Examiner* — Courtney Smith
(74) *Attorney, Agent, or Firm* — Barcelo, Harrison & Walker, LLP (57) ABSTRACT

Provided are a triple redundant digital protective relay and an operating method therefor. The triple redundant digital protective relay according to the present invention includes: three power monitoring control devices which have a triple redundant structure and control a circuit breaker for separating a failed power system based on a 2 out of 3 voting using real-time mutual data communication; and a central communication device which acquires data related to an operating state of the power system from the three power monitoring control devices and manages the acquired data related to the operating state of the power system.

8 Claims, 9 Drawing Sheets

(56) References Cited

U.S. PATENT DOCUMENTS

| | | | |
|---|---|---|---|
| 6,550,018 B1 | 4/2003 | Abonamah et al. | |
| 2004/0010350 A1* | 1/2004 | Lof | H02J 3/24 700/292 |
| 2015/0192936 A1* | 7/2015 | Kelly | H05K 7/1498 700/300 |
| 2016/0234922 A1* | 8/2016 | Tabata | C01B 13/11 |

FOREIGN PATENT DOCUMENTS

| | | |
|---|---|---|
| CN | 203444293 U | 2/2014 |
| EP | 0275362 A2 | 7/1988 |
| JP | 11-299074 A | 10/1999 |
| JP | 2005-006385 A | 1/2005 |
| KR | 10-2002-0064041 A | 8/2002 |
| KR | 10-0807342 B1 | 2/2008 |
| KR | 10-2010-0001926 A | 1/2010 |
| KR | 10-0990736 B1 | 10/2010 |

OTHER PUBLICATIONS

Korean Patent Abstract (in English) of KR Patent No. 10-0807342 B1, Pub. Date Feb. 28, 2008, downloaded on Jun. 6, 2017 from http://worldwide.espacenet.com/.

Japanese Patent Abstract (in English) of JP Pub. No. 11-299074 A, Pub. Date Oct. 29, 1999, downloaded on Jun. 6, 2017 from http://www4.j-platpat.go.jp/eng/.

Japanese Patent Abstract (in English) of JP Pub. No. 2005-006385 A, Pub. Date Jan. 6, 2005, downloaded on Jun. 6, 2017 from http://worldwide.espacenet.com/.

Korean Patent Abstract (in English) of KR Pub. No. 10-2002-0064041 A, Pub. Date Aug. 7, 2002, downloaded on Jun. 6, 2017 from http://worldwide.espacenet.com/.

Korean Patent Abstract (in English) of KR Patent No. 10-0990736 B1, Pub. Date Oct. 29, 2010, downloaded on Jun. 6, 2017 from http://worldwide.espacenet.com/.

International Search Report of Int. App. No. PCT/KR2015/013589 dated Mar. 23, 2016 from KIPO.

European Search Report from European Patent Office of Int. App. No. PCT/KR2015013589 (App. No. 15 870 250.6), dated Aug. 21, 2018.

Chinese Patent Abstract (in English) of Chinese Patent App. Pub. No. 101673936 A, Pub. Date Mar. 17, 2010, downloaded Oct. 11, 2018 from https://worldwide.espacenet.com.

Chinese Patent Abstract (in English) of Chinese Patent App. Pub. No. 201916175 U, Pub. Date Aug. 3, 2011, downloaded Oct. 11, 2018 from https://worldwide.espacenet.com.

Chinese Patent Abstract (in English) of Chinese Patent App. Pub. No. 203444293 U, Pub. Date Feb. 19, 2014, downloaded Oct. 11, 2018 from https://worldwide.espacenet.com.

Liang, H. et al.; "Adopt the "Two out of three" Protection Logic"; Electricity and Energy; vol. 33; No. 5; Oct. 2012 pp. 445-448.

Chinese Office Action of Chinese Patent App. No. 201580073132, dated Aug. 3, 2018.

* cited by examiner

TRIPLE REDUNDANT DIGITAL PROTECTIVE RELAY AND OPERATING METHOD THEREFOR

CROSS-REFERENCE TO RELATED APPLICATIONS

This application is the national stage for International Patent Cooperation Treaty Application PCT/KR2015/013589, filed Dec. 11, 2015, which claims priority from Korean Patent Application No. 10-2014-0180115, filed Dec. 15, 2014, in the Korean Intellectual Property Office. The entire contents of said applications are incorporated herein by reference for all purposes.

BACKGROUND

Technical Field

The present invention relates to a digital protective relay, and more particularly, a triple redundant digital protective relay and an operating method therefor.

Background Art

In general, protective relays are core devices for a health of a power system and are configured to analyze/monitor an operating state of a power system in real time and break a fault current flowing through a failed system by outputting a circuit breaker open signal immediately when a failure is detected, so as to prevent an electrical or mechanical failure of the power system from spreading to economical loss or unfortunate accident such as loss of precious human lives.

The most basic duty of such protective relays may be defined by operation sensitivity, selectivity, and speed. The operation sensitivity is an ability to recognize even a minimum failure, the selectivity is an ability to not misjudge a non-failure phenomenon as a failure, and the speed is an ability to operate as fast as possible so as to minimize a damage caused by a failure or spreading of the damage. Any one of them cannot be neglected.

If the protective relay fails to properly perform its operational duty, it may affect not only disruption of production or stoppage of work but also social disturbance, security, and the like. Until recently, blackouts occurred due to a series of malfunctions of relays in several countries including Korea. Since such blackouts are global issues and spread to economic and social problems, it is urgent that countermeasures be established.

In order to ensure the reliability of the protective relays that have to fulfill such important duties, it is compulsory to meet the safety and reliability standards presented by international standard bodies such as IEC, IEEE, and the like all over the world. In particular, the latest digital protective relays, which have been dominant since the 1980s, are devices manufactured based on highly-advanced high-precision/high-integration electronic technology, and standard specifications also tend to be reinforced with the times because the relays are sensitive to surge or noise and there are always the possibility of malfunction and incorrect operation during operation periods due to the deterioration of characteristics and rating caused by yearly variation.

However, since the test level defined in the specification is oriented toward generalization due to the attribute of the standard, it is hard to go beyond the basics. This can be seen from the fact that all the protective relays that have caused the large and small accidents of power systems until now were products certified as international standard.

In addition, recent digital protective relays have been expanded to such an extent that their function range has increased beyond comparison with the past due to the development of technology. Many functions of peripheral devices are integrated into the internal function of the protective relay, and thus, the whole system becomes simpler and more convenient. However, in practice, there is also a disadvantage that the failure of the multifunctional protective relay may deteriorate both reliability and functionality of the power system.

Even all the protective relay manufactures having a long history are constantly carrying out activities for reliability and quality improvement as well as functionality, based on many applications and experiences. This is an effort to comply with an increasingly extreme usage environment, but it is also a reality that the protective relays cannot be completely free from the risk and influence of internal failure. Therefore, there is always anxiety about the loss of life and property, occurrence of unnecessary opportunity costs, and the like. In particular, as can be seen in the case of Japan, since nuclear power plants have a great effect of failure, all major processes affecting safety are forced to use expensive products having a high safety grade.

As described above, there is a need to develop a technology that can significantly reduce the probability of failure and malfunction of protective relays and can increase the reliability of protective relays.

DETAILED DESCRIPTION OF THE INVENTION

Technical Problem

Therefore, the present invention has been made in an effort to solve the problems of the prior art, and it is an object of the present invention to provide a triple redundant digital protective relay, which implements a core function module of the protective relay in triple redundant structures and controls a circuit breaker for separating a failed power system based on a 2 out of 3 voting using real-time data communication between the implemented triple redundant modules, and an operating method therefor.

However, the object of the present invention is not limited to those described above, and other objects will be easily understood from the following description by those of ordinary skill in the art.

Technical Solution

In order to achieve the above objects, a triple redundant digital protective relay according to an aspect of the present invention may include: three power monitoring control devices which have a triple redundant structure and control a circuit breaker for separating a failed power system based on a 2 out of 3 voting using real-time mutual data communication; and a central communication device which acquires data related to an operating state of the power system from the three power monitoring control devices and manages the acquired data related to the operating state of the power system.

Preferably, the power monitoring control device may include: a CPU which controls a circuit breaker for separating a failed power system based on a 2 out of 3 voting using real-time data communication with other power monitoring control devices; a first circuit breaker trip circuit which is implemented by one signal relay as an output contact point for a trip control of the circuit breaker according to a control signal from the CPU; and a second circuit breaker trip circuit which is implemented by two signal relays connected in series as an output contact point for a trip control of the circuit breaker according to a control signal from the CPU.

Preferably, the power monitoring control device may control the one signal relay of the first circuit breaker trip circuit according to a logic operation result thereof based on a 1 out of 2 voting or a 2 out of 2 voting.

Preferably, when a failure occurs in the power system and an internal failure is detected from one of the three power monitoring control devices, the power monitoring control device may control the circuit breaker by using a logic operation based on the 1 out of 2 voting or the 2 out of 2 voting.

Preferably, the power monitoring control device may control one of the two signal relays connected in series according to a logic operation result thereof based on a 2 out of 3 voting, and control the other signal relay according to a logic operation result based on a 2 out of 3 voting of another power monitoring control device.

Preferably, when a failure occurs in the power system and no internal failure is detected from the three power monitoring control devices, the power monitoring control device may control the circuit breaker by using a logic operation based on the 2 out of 3 voting.

Preferably, the power monitoring control device detects a failure or non-failure of the power system based on quantity of electricity calculated based on a voltage and a current, and transmits a detection result to other power monitoring control devices by using a voting bus, so as to share the detection result with the other power monitoring control devices.

A method for operating a triple redundant digital protective relay according to another aspect of the present invention may include: detecting a failure or non-failure of a power system based on quantity of electricity calculated based on a voltage and a current; controlling a circuit breaker for separating a failed power system based on a 2 out of 3 voting using real-time mutual data communication through three power monitoring control devices which have a triple redundant structure; and acquiring data related to an operating state of the power system from the three power monitoring control devices and managing the acquired data related to the operating state of the power system.

Preferably, when a failure occurs in the power system and an internal failure is detected from one of the three power monitoring control devices, the controlling may include controlling the circuit breaker by using a logic operation based on the 1 out of 2 voting or the 2 out of 2 voting.

Preferably, when a failure occurs in the power system and no internal failure is detected from the three power monitoring control devices, the controlling may include controlling the circuit breaker by using a logic operation based on the 2 out of 3 voting.

Advantageous Effects

The present invention has an effect that can efficiently prevent malfunction or incorrect operation of a protective relay by implementing a core function module of the protective relay in triple redundant structures and controlling a circuit breaker for separating a failed power system based on a 2 out of 3 voting using real-time data communication between the implemented triple redundant modules.

Furthermore, the present invention has an effect that can stably operate a system because malfunction or incorrect operation can be prevented based on a logic operation using a 2 out of 3 voting.

Moreover, the present invention has an effect that can improve reliability because a system can be stably operated based on a logic operation using a 2 out of 3 voting.

DETAILED DESCRIPTION

Best Mode

Hereinafter, a triple redundant digital protective relay and an operating method therefor according to embodiments of the present invention will be described with reference to the accompanying drawings. The present invention will be described in detail while focusing on portions necessary to understand the operations and effects of the present invention.

Also, in describing elements of the present invention, different reference numerals may be assigned to elements of the same name according to the drawings, and the same reference numerals may be assigned in spite of different drawings. However, even in such a case, it does not mean that the corresponding elements have different functions according to the embodiments or have the same function in different embodiments, and the functions of the elements should be determined based on the description of the elements in the corresponding embodiment.

In particular, the present invention proposes a novel method which implements a core function module of the protective relay in triple redundant structures and controls a circuit breaker for separating a failed power system based on a 2 out of 3 voting using real-time data communication between the implemented triple redundant modules.

In developing a triple redundant protective relay, the present invention has the following technical problems for high reliability, high performance, multifunction, low cost, improvement of network efficiency, and improvement of engineering and ease of use, as compared with an existing triple redundant protection system.

1. It should be able to make a core function device inside one protective relay into triple redundant structures and perform all operation duties of the protective relay independently without mutual dependency between triple redundant devices, and even if one of them malfunctions, it should not affect the execution of the inherent duty function of the triple redundant protective relay.

2. Even if any one of the triple redundant core function devices inside one protective relay malfunctions, the result thereof should not affect the outside.

3. The triple redundant core function devices inside one protective relay should share their determination results with one another in real time and control a power system based on a high-reliability determination result through a 2 out of 3 voting trip mechanism.

4. Even if a failure occurs in a medium shared between the triple redundant core function devices inside one protective relay, it should not affect a safe operation of a 2 out of 3 voting trip mechanism.

5. The triple redundant core function devices inside one protective relay must always monitor the health of the operation through self-diagnosis, must mutually share the results with one another and be able to distinguish failure or false judgment when a failure occurs in any one of the core function devices during operations or when false judgment is made due to a failure of parts, and must have real-time discrimination that can exclude the false judgment from a 2 out of 3 voting trip mechanism.

6. If a failure occurs in any one of the triple redundant core function devices inside one protective relay and a 2 out of 3 voting trip mechanism cannot be performed, the reliability degradation should be minimized by automatic switching to a 2 out of 2 voting logic (serial dual redundancy) or a 1 out of 2 voting logic (parallel dual redundancy) according to a principle of on-site protection without user operation or delay time.

7. The core function device, which is excluded from a 2 out of 3 voting logic due to occurrence of an internal failure during operations, should maintain the reliability of the triple redundant protective relay by performing an attempt to recover a failure on its own with respect to a temporary failure. In addition, when recovered from a failure, the triple redundant protective relay should safely switch from the 2 out of 2 voting logic or the 1 out of 2 voting logic again to the 2 out of 3 voting logic. 8. The three core function devices should not affect real-time operation performance of a 2 out of 3 voting logic, a 1 out of 2 voting logic, or a 2 out of 2 voting logic of the triple redundant protective relay while operating in an asynchronous state so as to exclude mutual independency on each operation 9. A failed core function device among the triple redundant core function devices should not affect operation event and operation time record of the triple redundant protective relay.

10. When it is intended to control the power system by externally outputting high-reliability results determined through a 2 out of 3 voting trip mechanism among three core function devices, it is necessary to prevent a wrong output signal from being output to the outside due to a failure or malfunction of a contact point output device should not be output to the outside.

11. In order to external output high-reliability results determined through a 2 out of 3 voting trip mechanism between devices, the three core function devices should not have any connectivity or dependency with other internal devices. This is done for excluding the possibility that the high-reliability determination result is affected by the connection insecurity with other devices or the health problem of other devices, and thus, the output will fail or the malfunction will occur.

12. When an operating state of a power system is detected by a contact point, a false input signal caused by a failure or malfunction of a contact point input device should not be used for a relevant function operation.

13. Even if a failure occurs in the inside or outside of a power source necessarily required for a stable operation of the protective relay, the power source should be made into dual redundant power sources so as not to affect the operation of the triple redundant protective relay and always operate to share all electrical loads of the protective relay. Even if a failure occurs in one power source, it should not affect the other supply source. When the function of the failed power source is completely lost, the protective relay should be able to perform a stable operation with the other power source.

14. Even if a failure such as a short circuit occurs in a power system inside a device performing other functions as well as the triple redundant core function device, it should not affect a power source or a power system of a healthy device.

15. It should be able to obtain the same digital and analog data values and state change event records of digital data through any device of the three core function devices.

16. When various programs and setup data of the triple core function devices configured within one protective relay are updated or set at a production site and a use site, the same engineering and maintenance promptness as a protective relay having a single structure should be ensured by providing the same convenience as that when one protective relay is operated.

Figure 1:
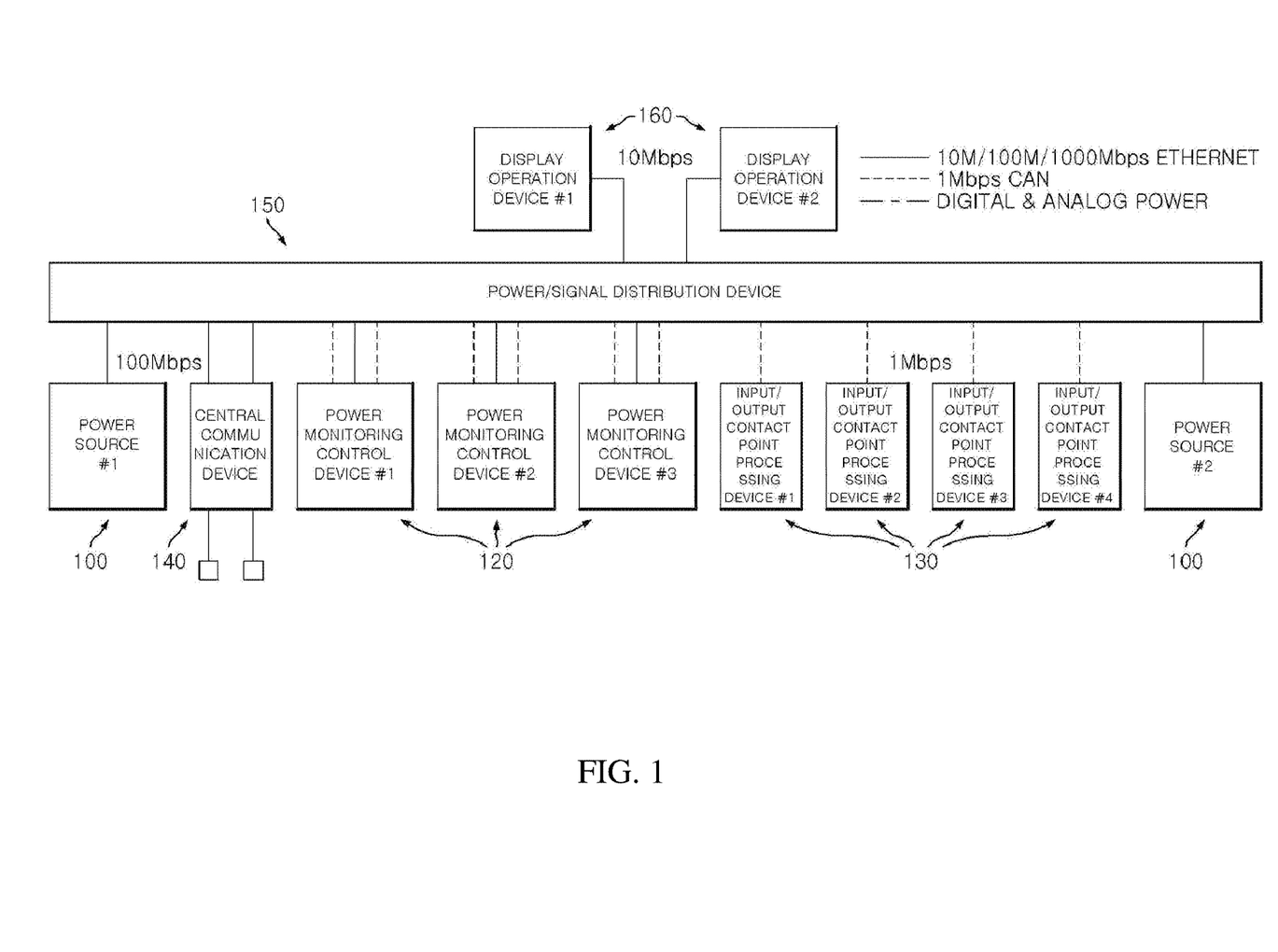
FIG. 1 is a diagram illustrating an internal configuration of a triple redundant digital protective relay according to an embodiment of the present invention.

FIG. 1 is a diagram illustrating an internal configuration of a triple redundant digital protective relay according to an embodiment of the present invention.

As illustrated in FIG. 1, the triple redundant digital protective relay according to the present invention may include power sources 110, power monitoring control devices 120, input/output contact point processing devices 130, a central communication device 140, a power/signal distribution device 150, and display operation devices 160.

The power source 110 may convert AC 110 V or DC 125 V into low-voltage power suitable for internal circuit operations of the protective relay and supply electrical energy alone or in parallel.

The power monitoring control device 120 may detect a voltage and a current of a power system, perform digital signal processing through analog-to-digital conversion, calculate various electricity quantities through a metering operation, monitor a failure of the power system through electricity quantity analysis, asymmetrically exchange information when a failure or abnormality occurs, derive a high-reliability determination result through a 2 out of 3 voting logic, and control a circuit breaker or other power devices.

In this case, the power monitoring control device 120 may have a triple redundant structure. Specifically, the power monitoring control device may operate in a single mode which drives one module when an internal failure is defected from two modules, that is, power monitoring control devices, may operate in a dual redundant mode of a 2 out of 2 voting or a 1 out of 2 voting which drives two modules when an internal failure is detected from one module, and may operate in a triple redundant mode of a 2 out of 3 voting which drives three modules when no internal failure is detected.

The input/output contact point processing device 130 may monitor an operating state of the power system at a digital input contact point, generate a control signal and an alarm signal of the protective relay at a digital output contact point to the outside, select up to four devices so as to be suitable for field application, and mount the selected devices on the protective relay.

The central communication device 140 may acquire operating state data of the power system, various electricity quantity metering values, and events from the power monitoring control device 120 and the input/output contact point processing device 130, may record and manage the acquired information in a database, may transmit the information of the database via communication in response to a request from an external device outside the protective relay, or may receive a command from an external device via communication, transmit data to an internal device inside the protective device, and process the data.

The power/signal distribution device 150 may be connected to the respective devices inside the protective relay, supply power to the respective devices, and perform communication and signal exchange between the respective devices.

The display operation device 160 may communicate with the central communication device to acquire and display the operating state of the protective relay recorded in the database and the operating state of the power system detected by the protective relay.

In this case, the display operation device 160 may include a button that allows a field user to issue a command to change operation characteristics of the protective relay or allows a field user to perform an operation for controlling the protective relay.

Figure 2:
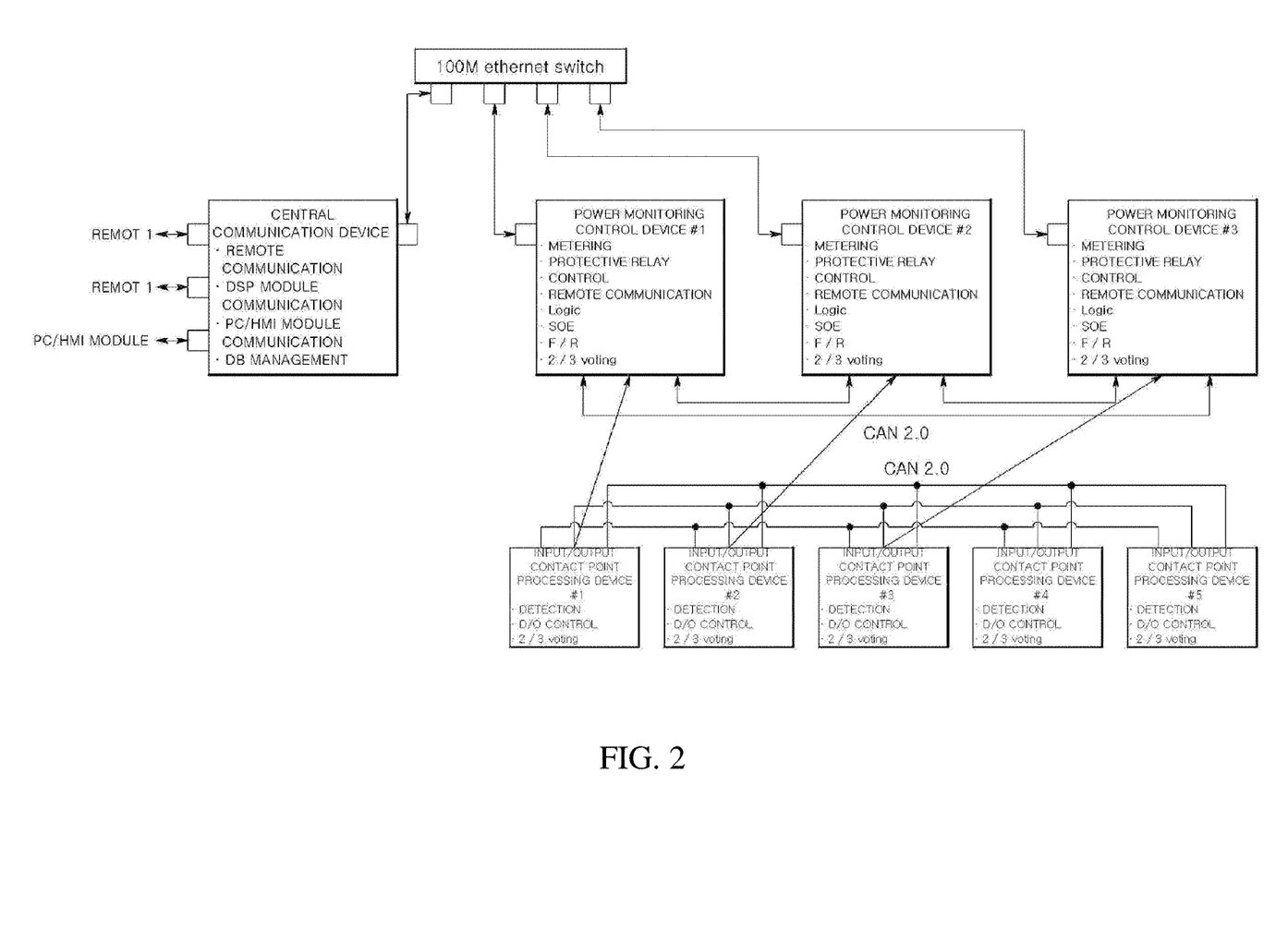
FIG. 2 is a diagram illustrating an internal network configuration of the triple redundant digital protective relay.

FIG. 2 is a diagram illustrating an internal network configuration of the triple redundant digital protective relay.

As illustrated in FIG. 2, the central communication device may transmit and receive a variety of information while interworking with the power monitoring control devices by using Ethernet communication, and transmit and receive a variety of information while interworking between the power monitoring control devices or the input/output contact point processing devices by using CAN communication.

The case where the Ethernet communication and the CAN communication are applied has been described as an example, but the present invention is not necessarily limited thereto. If necessary, various communication schemes may be applied.

Figure 3:
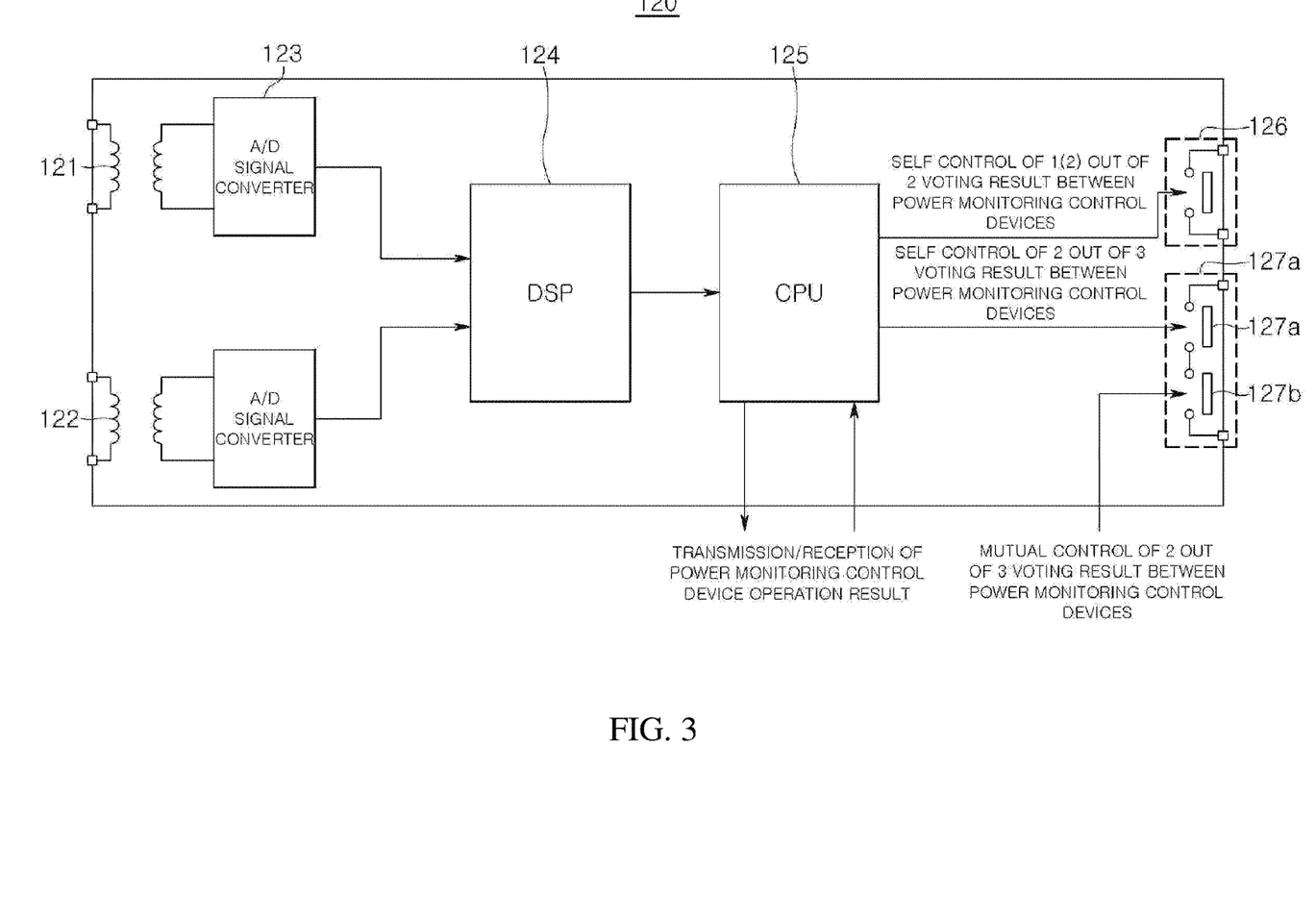
FIG. 3 is a diagram illustrating a functional structure of a power monitoring control device illustrated in FIG. 1.

FIG. 3 is a diagram illustrating a functional structure of the power monitoring control device illustrated in FIG. 1.

As illustrated in FIG. 3, the power monitoring control device 120 according to the present invention may include a current transformer 121, a potential transformer 122, an A/D signal converter 123, a digital signal processor (DSP) 124, a central processing unit (CPU) 125, a first circuit breaker trip circuit 126, and a second circuit breaker trip circuit 127.

The current transformer 121 is also referred to as CT and may transform a current flowing through a power line into a current having a small magnitude which can be processed by the power monitoring control device.

The potential transformer 122 is also referred to as PT and may transform a voltage of the power system into a low level voltage which can be detected by the power monitoring control device.

The A/D signal converter 123 may receive a converted analog signal from the current transformer 121 and the potential transformer 122 and convert the received analog signal into a digital signal.

The DSP 124 may perform signal processing on voltage and current signals of the power system, which are converted through the A/D signal converter, and perform various electricity quantity metering and measurement functions based on the signal processing result.

The CPU 125 may monitor a health of the power system by using voltage, current, and various electricity quantity data received from the DSP 124, and detect failure or non-failure of the power system through various failure detection algorithms.

In this case, the CPU 125 shares the result of monitoring the power system with other power monitoring control devices in real time.

When the failure of the power system is determined, the CPU 125 immediately transfers the determination result to the first circuit breaker trip circuit 126 and the second circuit breaker trip circuit 127 and performs a control function for promptly separating the failed system from the healthy system. In order for high-reliability failure monitoring and control, the CPU 125 shares the operation result information with other power monitoring control devices via dedicated communication by transmitting or receiving the operation result information. In a condition that all the three power monitoring control devices perform the normal operations without abnormality, the CPU 125 determines the operation result information of the other two power monitoring control devices other than the operation result information of one power monitoring control device through a 2 out of 3 voting mechanism, and controls a circuit breaker trip contact point 127a at which two control contact point devices are configured in series. A circuit breaker trip contact point 127b is controlled by a signal generated through a 2 out of 3 mechanism by another power monitoring control device.

In a case where a failure occurs in the circuit breaker trip contact point 127a or 127b, when a failure occurs in another power monitoring control device having a mutual control relationship or when a failure occurs in an operation result information transmission and reception path itself, three power monitoring control devices and peripheral devices are in an unhealthy state, and thus, a control signal cannot be output through a high-reliability circuit breaker trip contact point. In this case, the determination result of the failed power monitoring control device is ignored, an AND logic operation or an OR logic operation is performed on the result of the power monitoring control device itself or the operation result of another healthy power monitoring control device, a final determination is made by the output of the logic, and the circuit breaker is controlled through the single circuit breaker trip circuit 126.

The first circuit breaker trip circuit 126 and the second circuit breaker trip circuit 127 may control the circuit breakers according to the control based on the operation result information of the power monitoring control device of the CPU 125.

Figure 4:
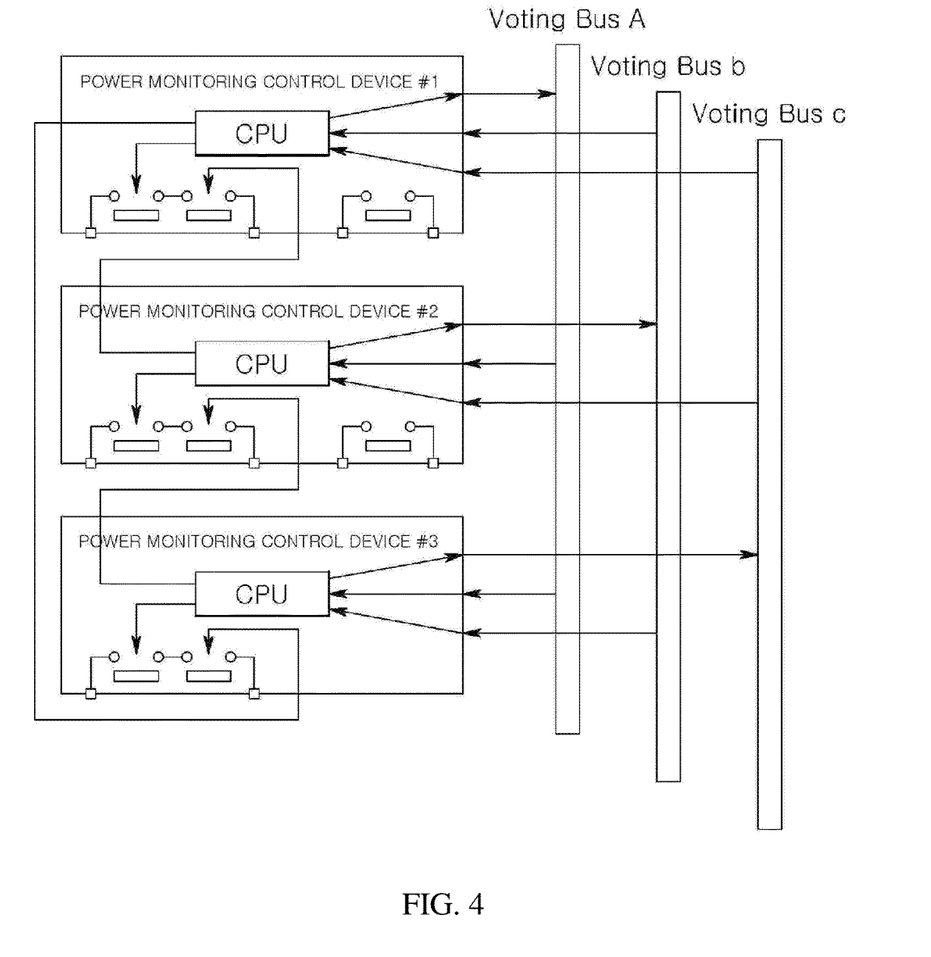
FIG. 4 is a diagram illustrating a mutual connection relationship of power monitoring control devices having a triple redundant structure.

FIG. 4 is a diagram illustrating a mutual connection relationship of the power monitoring control devices having a triple redundant structure.

As illustrated in FIG. 4, the power monitoring control devices having the triple redundant structure according to the present invention may share operation result information with one another by using voting buses by transmitting and receiving the operation result information.

As an example, the power monitoring control device #1 transmits its own operation result information via a voting bus A, receives operation result information of the power monitoring control device #2 via a voting bus B, and receive operation result information of the power monitoring control device #3 via a voting bus C.

As another example, the power monitoring control device #2 transmits its own operation result information via the voting bus B, receives operation result information of the power monitoring control device #1 via the voting bus A, and receive operation result information of the power monitoring control device #3 via the voting bus C.

As another example, the power monitoring control device #3 transmits its own operation result information via the voting bus C, receives operation result information of the power monitoring control device #1 via the voting bus A, and receive operation result information of the power monitoring control device #2 via the voting bus B.

Figure 5:
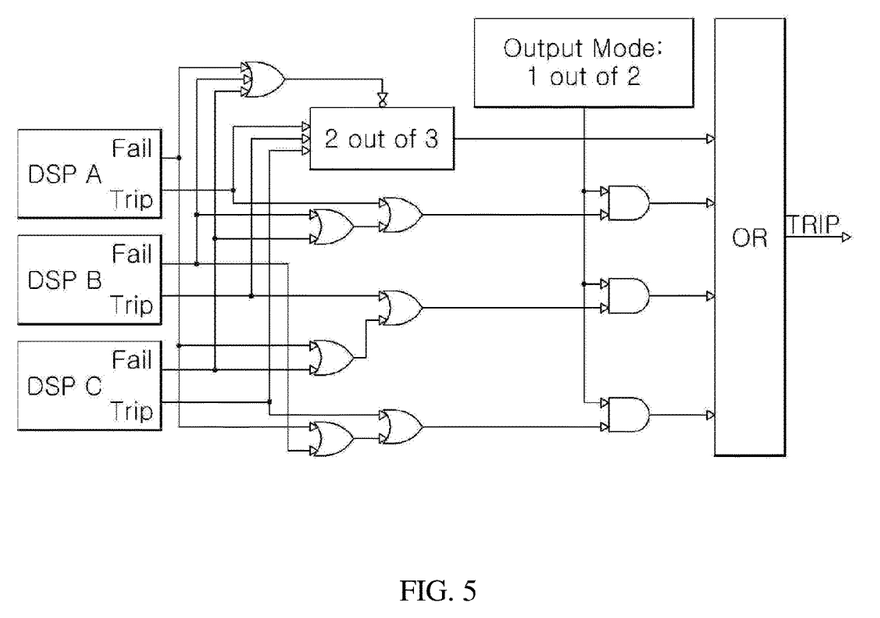
FIG. 5 is a diagram illustrating an operation mechanism of the power monitoring control device illustrated in FIG. 1.

FIG. 5 is a diagram illustrating the operation mechanism of the power monitoring control devices illustrated in FIG. 1.

As illustrated in FIG. 5, the key operation of the triple redundant protective relay includes a protective relay algorithm operation that allows each of the power monitoring control devices to receive the voltage and current of the power system through the potential transformer and the current transformer, meters the quantity of electricity, monitors the operating state of the power system, and monitors and detects the failure of the power system, and any operations in which the state monitoring of the circuit breaker is performed, the result is exchanged via dedicated communication between the power monitoring control devices, each of the three power monitoring control devices compares its own determination result with the determination results of the other two power monitoring control devices through a 2 out of 3 voting logic, the determination results are evaluated as reliable when two or more determination results are identical to each other, the determination results are input to a user-defined logic function, and the power device is controlled by outputting control and alarm signals calculated as a user-defined logic operation result to the outside. Each of the power monitoring control devices includes two output contact points for trip control of the power device, in particular, the circuit breaker. Of the two output contact points, one contact point constitutes two signal relays in series. One of the two signal relays connected in series is controlled based on the power monitoring control device's own 2 out of 3 voting logic operation result, and the other signal relay is controlled based on a 2 out of voting logic operation result of another power monitoring control device. In this way, the external output is allowed only when the two signal relays operate. Risk factors that may cause the triple redundant protective relay to malfunction due to the failure of the single signal relay itself or the control circuit thereof are excluded. Since a signal for controlling a signal relay of another power monitoring control device is transmitted to an inner layer conductor of a printed circuit board (PCB) through a differential transmission device, the structure is robust against external noise or command mode noise that resonates with a switching frequency of a peripheral circuit. In addition, since the signal for controlling the signal relay of another power monitoring control device is output in a valid state only when the 2 out of 3 voting trip operation result of the power monitoring control device that is a signal transmitter is true, this is also a structure that excludes a malfunction.

Due to the failure or error of a certain power monitoring control device, a signal relay capable of being autonomously controlled may be incorrectly operated, and both the two signal relays may malfunction only when the failure or error occurs in another power monitoring control device that is another signal relay controller connected in series. This is for a security failure of a serial dual redundant mode and is a mode having a lowest security failure as compared with a single mode, a parallel dual redundant mode, and a serial/parallel triple redundant mode. It can be said that the possibility thereof is also low.

Each of the power monitoring control devices generates two or more same determination results logically by a 2 out of 3 voting logic and outputs a control signal to the outside through an output contact point of a serial dual redundant configuration. Thus, if each output contact point of all the power monitoring control devices is connected in series to a circuit breaker trip coil, two serial contact points controlled cooperatively are configured as three parallel circuits. Therefore, it can be operated as a high-reliability fail safe structure.

The 2 out of 3 voting logic operates only when the three power monitoring control devices are all in a healthy state, and the 2 out of 3 voting logic stops operating when a failure occurs in one power monitoring control device.

As described above, since the three power monitoring control devices exchange operation results with one another through real-time communication, all the power monitoring control devices logically derive high-reliability determination results through the 2 out of 3 voting logic, the signal relay physically constituting the contact points is configured in a serial dual redundant mode, the main controller is also separated. Therefore, even when a certain power monitoring control device generates an output as a determination error, or even when a failure occurs in the entire power monitoring control devices as well as parts and part-related circuits, the triple redundant protective relay may always perform inherent operation duty while maintaining high reliability.

To this end, each of the power monitoring control devices separately includes a voltage and current detection circuit of the power system, and a state detection circuit and a control output circuit of the circuit breaker. In addition, an arithmetic operation device for performing a metering operation and a protective relay algorithm, a user-defined logic function for detecting a state of the power system and a state of the peripheral device and outputting a corresponding appropriate control, an event processing function capable of detecting an operation history and a failure history, a memory for recording, and a non-volatile memory for storing setup data for an optimal operation are included in each of the operation processing units, thereby excluding dependency on other devices.

Figure 6:
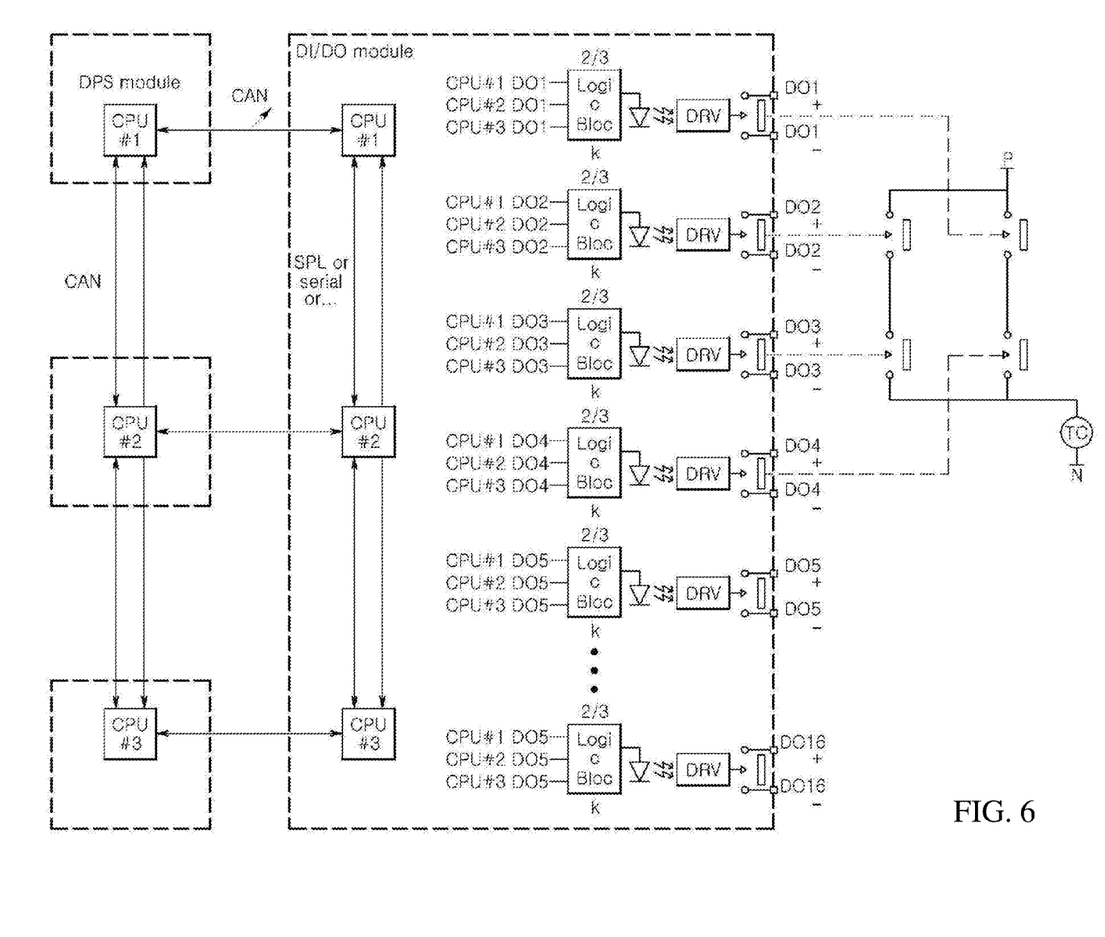
FIG. 6 is a diagram illustrating a configuration of an input/output contact point processing device, according to an embodiment of the present invention.

FIG. 6 is a diagram illustrating a configuration of an input/output contact point processing device according to an embodiment of the present invention.

As illustrated in FIG. 6, the input/output contact point processing device according to the present invention monitors an operating state of the power system and generates a control signal and an alarm signal of the protective relay to the outside.

Figure 7:
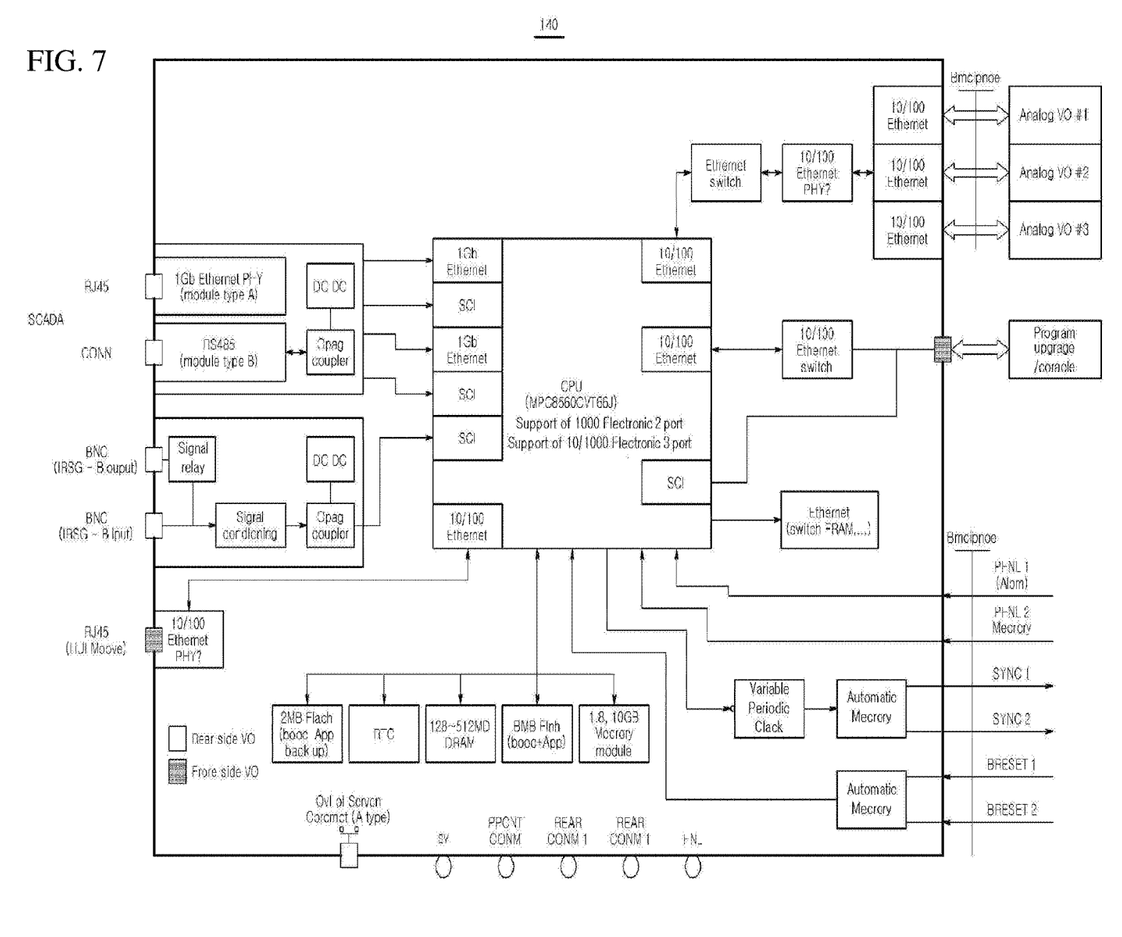
FIG. 7 is a diagram illustrating a functional structure of a central communication device, according to an embodiment of the present invention.

FIG. 7 is a diagram illustrating a functional structure of a central communication device according to an embodiment of the present invention.

As illustrated in FIG. 7, the central communication device 140 according to the present invention may acquire operating state data and various electricity quantity metering values of the power system, events, and the like from the power monitoring control devices 120 and the input/output contact point processing devices 130, and record and manage the acquired information in the database.

The central communication device 140 may transmit the information of the database in response to a request from an external device outside the protective relay, or receive a command from an external device via communication, transmit the information to an internal device of the protective relay based on the command, and process the information.

Figure 8:
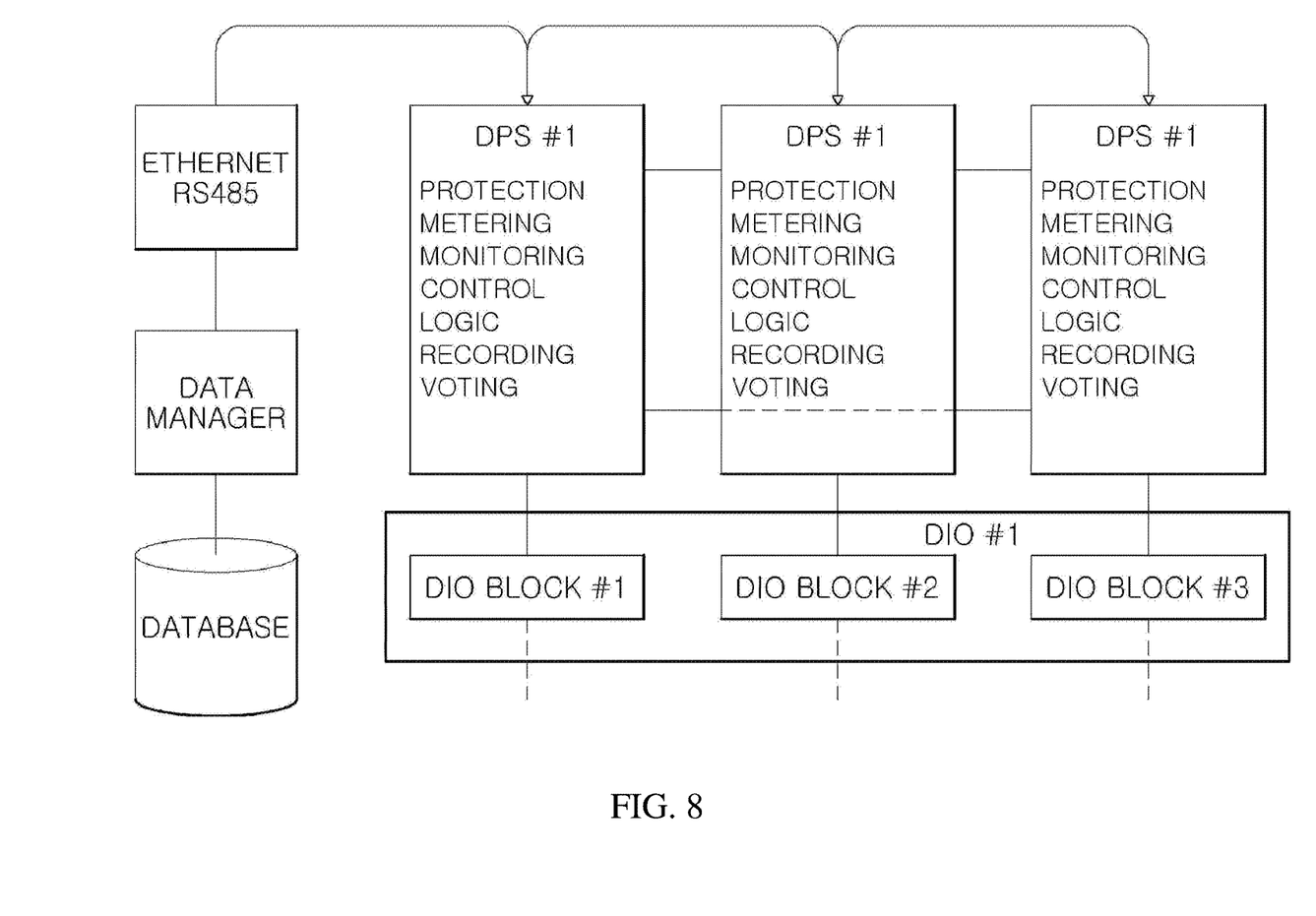
FIG. 8 is a diagram illustrating a mutual relationship between the power monitoring control device and the central communication device.

FIG. 8 is a diagram illustrating a mutual relationship between the power monitoring control device and the central communication device.

As illustrated in FIG. 8, the central communication device according to the present invention may transmit and receive a variety of information while interworking with the power monitoring control devices having the triple redundant structure by using Ethernet communication.

Figure 9:
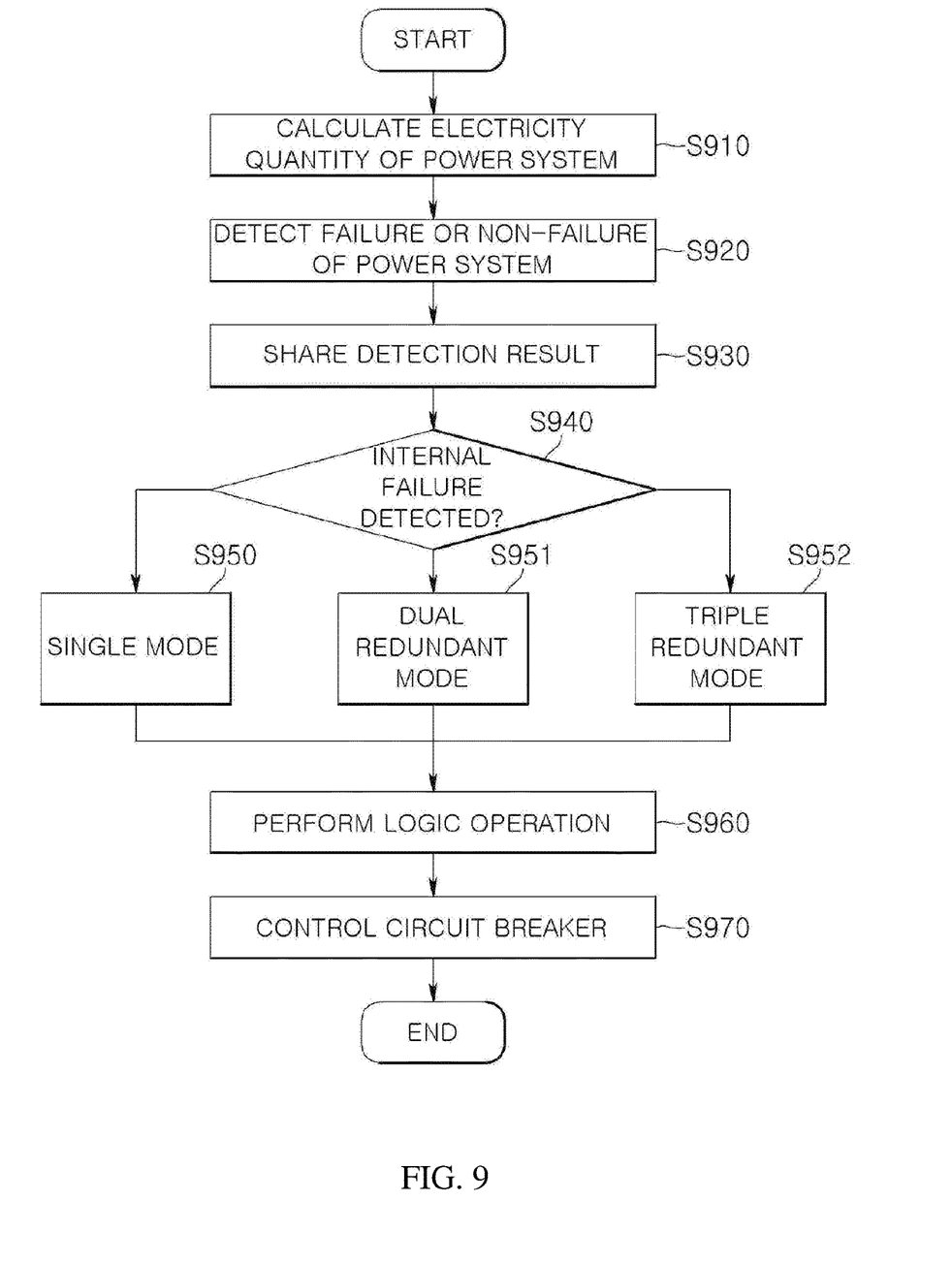
FIG. 9 is a diagram illustrating a method for operating a triple redundant digital protective relay, according to an embodiment of the present invention.

FIG. 9 is a diagram showing a method for operating a triple redundant digital protective relay, according to an embodiment of the present invention.

As illustrated in FIG. 9, the power monitoring control device according to the present invention may calculate various electricity quantities of a power system by detecting a voltage and a current of the power system and performing digital signal processing and metering operations through analog-to-digital conversion based on the detected voltage and current.

Subsequently, the power monitoring control device may analyze the calculated electricity quantities and detect a failure or non-failure of the power system based on the analysis result.

Subsequently, the power monitoring control device may share monitoring result information with other power monitoring control devices by interworking with other power monitoring control devices and transmitting or receiving the monitoring result information interwork to other power monitoring control devices via dedicated communication.

Subsequently, the power monitoring control device may detect internal failure based on the shared monitoring result information. That is, the power monitoring control device may be set to a single mode that, when internal failure is detected in two power monitoring control devices, drives one power monitoring control device.

On the other hand, the power monitoring control device may be set to a serial dual redundant mode of a 2 out of 2 voting or a parallel dual redundant mode of a 1 out of 1 voting that, when internal failure is detected in one power monitoring control device, drives two power monitoring control devices.

On the other hand, the power monitoring control device may be set to a triple redundant mode of a 2 out of 3 voting that, when no internal failure is detected, drives three power monitoring control devices.

Subsequently, the power monitoring control device may perform logic processing, for example, AND logic or OR logic processing on the detection result of the corresponding power monitoring control device according to the determined mode and make a final determination on the control of the circuit breaker based on the logic processing result.

Subsequently, the power monitoring control device may control the circuit breaker according to the final determination.

Even though all of elements of the embodiments according to the present invention have been described as being coupled or as being coupled and operating as one element, the present invention is not limited to the embodiments. That is, to the extent of the purpose of the present invention, all of such elements may be selectively coupled and operate as one or more elements. Such elements may be realized by each individual hardware, but all or part of such elements may be selectively combined into a computer program having a program module performing partial or all functions combined by single hardware or a plurality of hardware.

Such computer program may be stored in computer readable media, such as USB memory, CD disk, or flash memory, and may be read and executed by the computer to thereby realize the embodiments of the present invention. The computer readable media for the computer program may include magnetic recording media, optical recording media, and carrier wave media.

The embodiments described above are merely examples, and it will be understood by those of ordinary skill in the art that various modifications and changes may be made thereto without departing from the spirit and scope of the present invention. Therefore, the embodiments disclosed in the present invention are not intended to limit the scope of the present invention, but are for illustrative purposes. The spirit and scope of the present invention is not limited by these embodiments. The scope of the present invention should be defined by the appended claims. All equivalents of the claims fall within the scope of the present invention.

What is claimed is:

1. A triple redundant digital protective relay comprising:
three power monitoring control devices which have a triple redundant structure and control a circuit breaker for separating a failed power system based on a 2 out of 3 voting using real-time mutual data communication; and
a central communication device which acquires data related to an operating state of a power system from the three power monitoring control devices and manages the acquired data related to the operating state of the power system,
wherein each of the three power monitoring control devices comprises:
a CPU which controls a circuit breaker for separating a failed power system based on a 2 out of 3 voting using real-time data communication with other power monitoring control devices;
a first circuit breaker trip circuit which is implemented by one signal relay as an output contact point for a trip control of the circuit breaker according to a first control signal from the CPU; and
a second circuit breaker trip circuit which is implemented by two signal relays connected in series as an output contact point for a trip control of the circuit breaker according to a second control signal from the CPU,
wherein each of said power monitoring control devices controls one of said two signal relays connected in series according to a first logic operation result thereof based on a 2 out of 3 voting, and controls said one signal relay according to a second logic operation result based on a 2 out of 3 voting of another of said power monitoring control devices.

2. The triple redundant digital protective relay of claim 1, wherein each of said power monitoring control devices controls said one signal relay of the first circuit breaker trip circuit according to a third logic operation result thereof based on a 1 out of 2 voting or a 2 out of 2 voting.

3. The triple redundant digital protective relay of claim 2, wherein, when a failure occurs in the power system and an internal failure is detected from one of the three power monitoring control devices, the power monitoring control device controls the circuit breaker by using said third logic operation based on the 1 out of 2 voting or the 2 out of 2 voting.

4. The triple redundant digital protective relay of claim 1, wherein, when a failure occurs in the power system and no internal failure is detected from the three power monitoring control devices, each of said power monitoring control devices controls the circuit breaker by using said first or second logic operation based on the 2 out of 3 voting.

5. The triple redundant digital protective relay of claim 1, wherein each of said power monitoring control devices detects a failure or non-failure of the power system based on quantity of electricity calculated based on a voltage and a current, and transmits a detection result to other of said power monitoring control devices by using a voting bus, so as to share the detection result with the other of said power monitoring control devices.

6. A method for operating a triple redundant digital protective relay, the method comprising:
   detecting a failure or non-failure of a power system based on quantity of electricity calculated based on a voltage and a current;
   controlling a circuit breaker for separating a failed power system based on a 2 out of 3 voting using real-time mutual data communication through three power monitoring control devices which have a triple redundant structure; and
   acquiring data related to an operating state of the power system from the three power monitoring control devices and managing the acquired data related to the operating state of the power system,
   wherein each of the three power monitoring control devices comprises:
   a CPU which controls a circuit breaker for separating a failed power system based on a 2 out of 3 voting using real-time data communication with other power monitoring control devices;
   a first circuit breaker trip circuit which is implemented by one signal relay as an output contact point for a trip control of the circuit breaker according to a first control signal from the CPU; and
   a second circuit breaker trip circuit which is implemented by two signal relays connected in series as an output contact point for a trip control of the circuit breaker according to a second control signal from the CPU,
   wherein each of said power monitoring control devices controls one of said two signal relays connected in series according to a first logic operation result thereof based on a 2 out of 3 voting, and controls said one signal relay according to a second logic operation result based on a 2 out of 3 voting of another of said power monitoring control devices.

7. The method of claim 6, wherein, when a failure occurs in the power system and an internal failure is detected from one of the three power monitoring control devices, the controlling comprises controlling the circuit breaker by using a third logic operation based on a 1 out of 2 voting or a 2 out of 2 voting.

8. The method of claim 6, wherein, when a failure occurs in the power system and no internal failure is detected from the three power monitoring control devices, the controlling comprises controlling the circuit breaker by using said first or second logic operation based on the 2 out of 3 voting.

* * * * *